(12) United States Patent
Weng et al.

(10) Patent No.: US 6,477,329 B2
(45) Date of Patent: Nov. 5, 2002

(54) DIGITAL CAMERA WITH ROTATABLE COMPONENTS

(75) Inventors: Shih-Hsiung Weng, Taipei (TW); Chee-Heem Hoe, Taipei (TW)

(73) Assignee: Inventec Multimedia & Telecom Corporation, Taipei (TW)

( * ) Notice: Subject to any disclaimer, the term of this patent is extended or adjusted under 35 U.S.C. 154(b) by 0 days.

(21) Appl. No.: 09/912,532

(22) Filed: Jul. 26, 2001

(65) Prior Publication Data

US 2002/0067920 A1 Jun. 6, 2002

(30) Foreign Application Priority Data

Dec. 1, 2000 (TW) .......................... 089220919

(51) Int. Cl.[7] .................. G03B 17/18; G03B 13/10; H04N 5/225; H04N 5/238; H04N 9/74
(52) U.S. Cl. .................. 396/287; 396/374; 396/381; 348/333.06; 348/333.09; 348/369; 348/371; 348/376; 348/583
(58) Field of Search .................. 396/287, 374, 396/381; 348/333.06, 333.08, 333.09, 341, 369, 371, 373, 376, 374, 583

(56) References Cited

U.S. PATENT DOCUMENTS

| | | | | |
|---|---|---|---|---|
| 4,666,275 A | * | 5/1987 | Tamamura | 396/199 |
| 5,557,329 A | * | 9/1996 | Lim | 348/373 |
| 5,950,029 A | * | 9/1999 | DeCecca et al. | 396/380 |
| 6,377,302 B1 | * | 4/2002 | Ozaki et al. | 348/231 |

* cited by examiner

*Primary Examiner*—David M. Gray
*Assistant Examiner*—Rochelle Ann J Blackman
(74) *Attorney, Agent, or Firm*—Bacon & Thomas

(57) ABSTRACT

A digital camera with rotatable components is disclosed. In the front of camera there is provided a lens, a flash, and a viewfinder, while in the rear thereof there is provided a liquid crystal display (LCD) corresponding to lens, a control button, and the rear of viewfinder. Control button is operable to press for rotating lens, flash, viewfinder, and LCD in the same direction and into a desired angle with respect to an object. Next a shutter button on the camera is operable to press for taking a picture. This camera has the benefits of ergonomic, precise picture taking, and full covering of the object by flash.

1 Claim, 4 Drawing Sheets

DIGITAL CAMERA WITH ROTATABLE COMPONENTS

FIELD OF THE INVENTION

The present invention relates to digital cameras and more particularly to a digital camera with rotatable components such as lens, flash, viewfinder, and liquid crystal display (LCD) with improved picture taking characteristics.

BACKGROUND OF THE INVENTION

Conventionally, a lens, a flash, a viewfinder, and a liquid crystal display (LCD) mounted on a digital camera such as digital still camera are not rotatable. Hence, user may view an object through viewfinder and LCD for taking a picture horizontally or rotate camera to cause viewfinder and LCD to be perpendicular to the horizontal plane, thereby seeing the object in the vertically disposed viewfinder and LCD for taking a picture vertically. However, the previous design (i.e., camera disposed horizontally or vertically) is not ergonomic. Further, it is possible for user to drop camera on the ground or even cause damage therefrom when rotating the camera.

Thus, it is desirable to provide an improved digital camera with rotatable components such as lens, flash, viewfinder, and LCD. User may simply press a control button for effecting a rotation of lens, flash, viewfinder, and LCD into a horizontal or vertical position prior to taking a picture.

SUMMARY OF THE INVENTION

It is an object of the present invention to provide a digital camera with rotatable components such as lens, flash, viewfinder, and liquid crystal display (LCD) wherein user may press a control button for rotating lens, flash, viewfinder, and LCD in the same direction and into a desired angle with respect to an object. This digital camera has the benefits of ergonomic, precise picture taking, full covering of object by flash, and without worrying the dropping or damage caused therefrom as experienced in prior art while horizontally or vertically taking a picture.

The above and other objects, features and advantages of the present invention will become apparent from the following detailed description taken with the accompanying drawings.

DETAILED DESCRIPTION OF THE PREFERRED EMBODIMENTS

Figure 1:
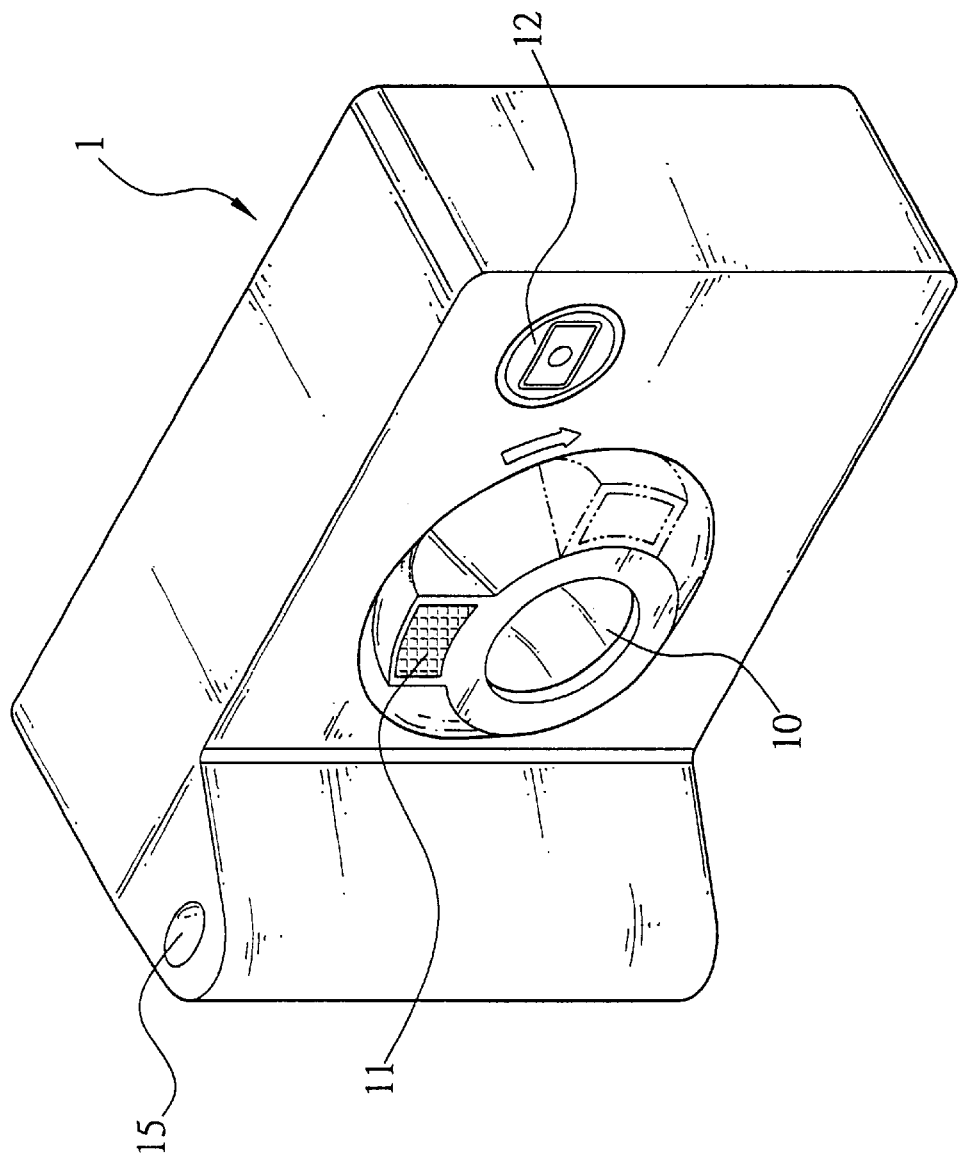
FIG. 1 is a front perspective view of a digital camera according to the invention.

Referring to FIGS. 1 through 4, there is shown a digital camera 1 with rotatable components constructed in accordance with the invention. In the front side, the camera comprises a lens 10, aflash 11, and a viewfinder 12. In the rear side, the camera further comprises a liquid crystal display (LCD) 13 disposed corresponding to lens 10, a control button 14, and the rear of viewfinder 12. A gear assembly 20 is activated when control button 14 is pressed. Then lens 10, flash 11, viewfinder 12, and LCD 13 are rotated in the same direction and into a desired angle with respect to an object. Next user may press a shutter button 15 on the top of camera 1 for taking a picture. Further, the object is completely covered by the light projected from flash 11. Furthermore, this is an ergonomic design. Most importantly, a precise picture taking is carried out.

Figure 2:
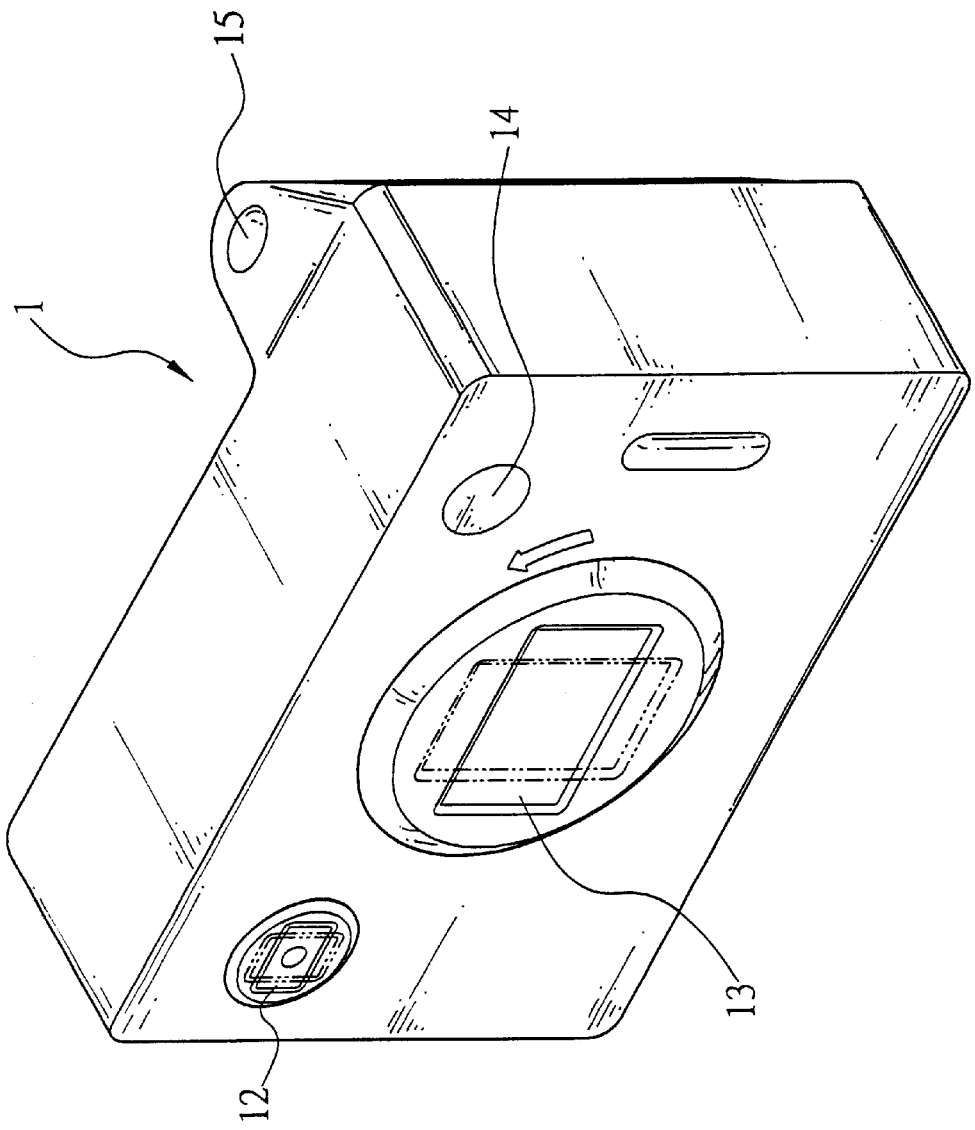
FIG. 2 is a rear perspective view of the FIG. 1 camera.
Figure 3:
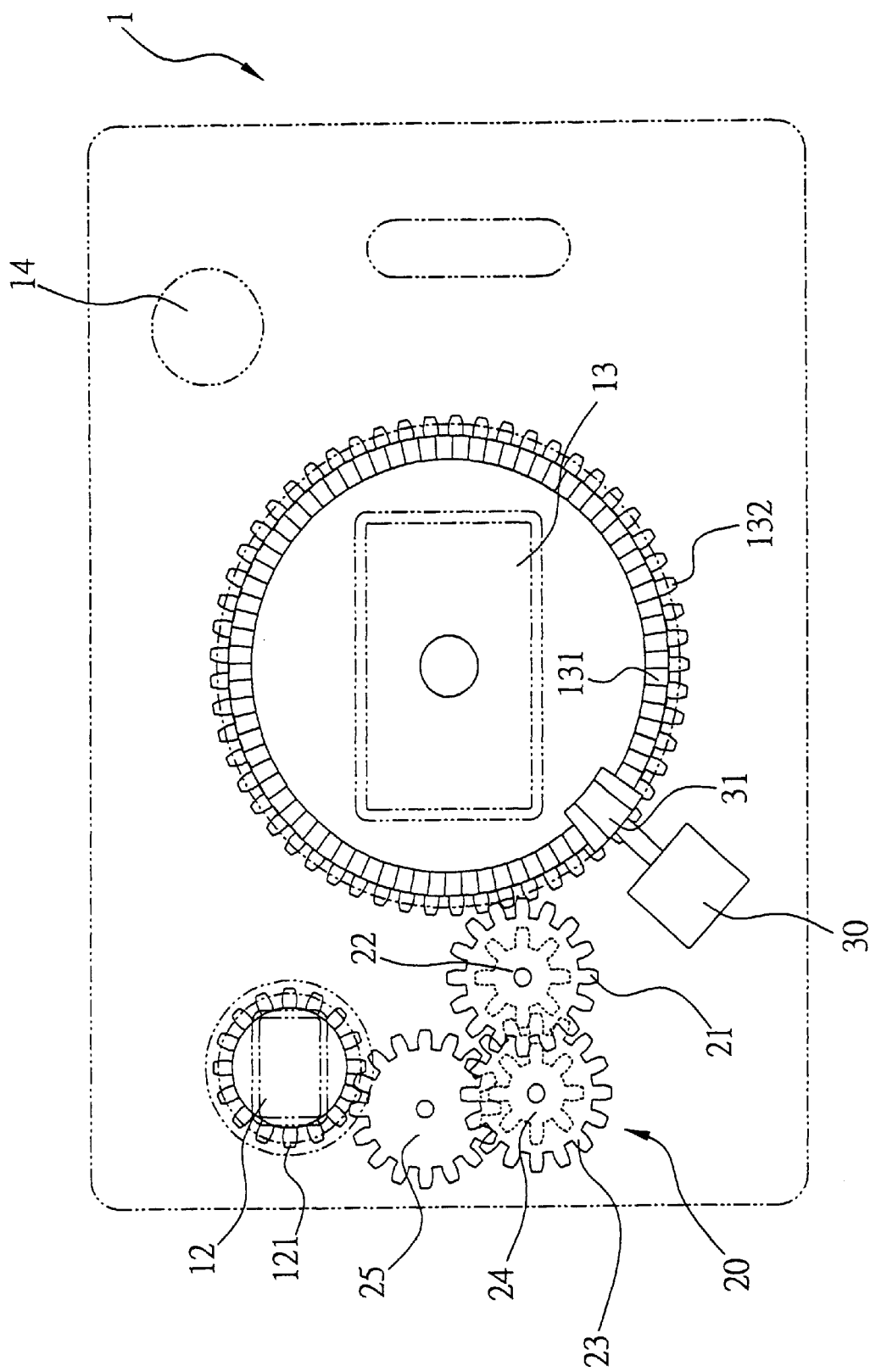
FIG. 3 is a rear plan view showing certain internal components of the FIG. 1 camera.
Figure 4:
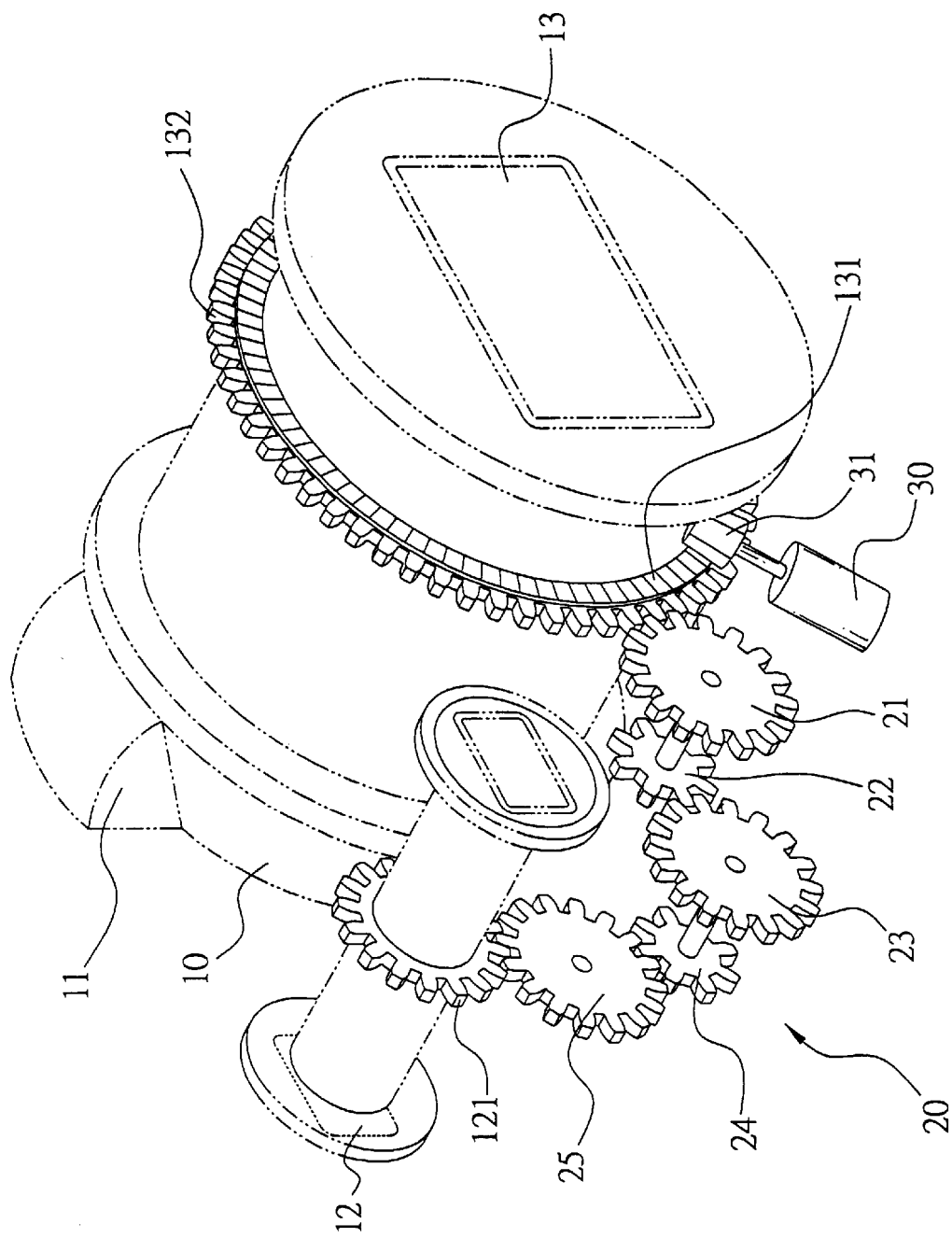
FIG. 4 is perspective view of the FIG. 3 components.

The components of camera 1 are enclosed by a housing. Flash 11 is fixed to the top of lens 10 in the front side of camera 1 while LCD 13 is disposed corresponding to lens 10 in the rear side thereof (FIGS. 1 and 2). As shown in FIGS. 3 and 4, a first gear member 131 is formed along a shoulder on the periphery of a cylindrical member coupled to LCD 13 and a second gear member 132 is formed abutted the shoulder on the periphery of cylindrical member. First gear member 131 is meshed with gear 31 coupled to a drive device 30 through a shaft. Hence, LCD 13 may be rotated when gear 31 is driven clockwise or counterclockwise by drive device 30. In the embodiment, the drive device 30 is a motor while it is appreciated by those skilled in the art that the drive device 30 may be replaced by another suitable device without departing from the scope and spirit of the invention. Gear assembly 20 comprises, as viewed from LCD 13 toward lens 10, a first gear 21, a second gear 22, a second gear 23, a fourth gear 24, and a fifth gear 25. The diameter of first gear 21 is larger than that of second gear 22. The diameter of third gear 23 is larger than that of fourth gear 24. The diameter of first gear 21 is larger than that of second gear 22. First gear 21 is meshed with second gear member 132. Thus third gear 23 may be driven by second gear 22 and fourth gear 24 may be driven by fifth gear 25 respectively.

A third gear member 121 is formed on the periphery of another cylindrical member coupled to viewfinder 12. Third gear member 121 is meshed with fifth gear 25. Thus LCD 13, viewfinder 12, lens 10, and flash 11 are rotated in the same direction and into a desired angle with respect to an object when gear assembly 20 is driven clockwise or counterclockwise by drive device 30 (see FIGS. 1 and 2). In the embodiment, control button 14 is electrically coupled to a printed circuit (now shown) in camera 1. Hence, when control button 14 is pressed lens 10, flash 11, viewfinder 12, and LCD 13 are rotated in the same direction and into a desired angle with respect to the object as driven by gear assembly 20 which is in turn driven by drive device 30 (see FIGS. 1 and 2). Next user may press shutter button 15 on the top of camera 1 for taking a picture.

In brief, lens 10, flash 11, viewfinder 12, and LCD 13 may be rotated in the same direction and into a desired angle with respect to an object by pressing control button 14. This is an ergonomic design. Most importantly, a precise picture taking is carried out.

While the invention has been described by means of specific embodiments, numerous modifications and variations could be made thereto by those skilled in the art without departing from the scope and spirit of the invention set forth in the claims.

What is claimed is:

1. A digital camera enclosed in a housing comprising:

a lens and a flash in a front portion of a housing;

a liquid crystal display (LCD) in a rear portion of said housing and corresponding to said lens;

a first gear means on periphery of a first cylindrical member coupled to said. LCD;

a viewfinder extended from said front to said rear;

a second gear means on periphery of a second cylindrical member coupled to said viewfinder;

a drive means in said housing having a gear meshed with said first gear means;

a gear assembly in said housing meshed with said first and said second gear means respectively;

a control button on said housing electrically coupled to a circuit in said housing for controlling said activation of said drive means; and a shutter button on said housing being operable to press for taking a picture;

wherein said first gear means comprises a first gear member along a shoulder on said periphery of said first cylindrical member coupled to said LCD, said first gear member is meshed with said gear of said drive means, and a second gear member abutted said shoulder on said periphery of said first cylindrical member;

said second gear means is meshed with one gear in said gear assembly such that said LCD, said viewfinder, said lens, and said flash are rotated in a same direction and into a desired angle with respect to an object when said gear assembly is driven clockwise or counterclockwise by said drive means.

* * * * *